United States Patent
Matsuura et al.

(10) Patent No.: US 9,595,396 B2
(45) Date of Patent: Mar. 14, 2017

(54) ELECTROLYTIC CAPACITOR AND MANUFACTURING METHOD THEREFOR

(71) Applicant: Panasonic Intellectual Property Management Co., Ltd., Osaka (JP)

(72) Inventors: Hiroyuki Matsuura, Shiga (JP); Shigetaka Furusawa, Kyoto (JP); Hidehiro Sasaki, Toyama (JP); Tatsuji Aoyama, Yamaguchi (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 14/932,951

(22) Filed: Nov. 4, 2015

(65) Prior Publication Data

US 2016/0064151 A1    Mar. 3, 2016

Related U.S. Application Data

(63) Continuation of application No. 13/574,390, filed as application No. PCT/JP2011/000660 on Feb. 7, 2011, now Pat. No. 9,208,954.

(30) Foreign Application Priority Data

Feb. 15, 2010    (JP) .................................. 2010-029772

(51) Int. Cl.
*H01G 9/022*    (2006.01)
*H01G 9/00*    (2006.01)
(Continued)

(52) U.S. Cl.
CPC ............. *H01G 9/145* (2013.01); *H01G 9/035* (2013.01); *H01G 9/055* (2013.01); *H01G 9/07* (2013.01);
(Continued)

(58) Field of Classification Search
CPC ........ H01G 9/022; H01G 9/00; H01G 9/0032; H01G 9/035; H01G 9/145; H01G 9/032
(Continued)

(56) References Cited

U.S. PATENT DOCUMENTS 5,055,974 A * 10/1991 Washio ................. H01G 9/022
                                                                        252/62.2
6,307,735 B1    10/2001 Saito et al.
(Continued)

FOREIGN PATENT DOCUMENTS

CN    101261900    9/2008
CN    101385105    3/2009
(Continued)

OTHER PUBLICATIONS

The Extended European Search Report dated May 19, 2015 for the related European Patent Application No. 11742011.7.
(Continued)

*Primary Examiner* — Eric Thomas
*Assistant Examiner* — Michael P McFadden
(74) *Attorney, Agent, or Firm* — Panasonic IP Management; Kerry S. Culpepper

(57) ABSTRACT

An electrolytic capacitor includes a capacitor element, and an electrolyte solution with which the capacitor element is impregnated. The capacitor element includes an anode foil having a dielectric layer on a surface thereof, and a solid electrolyte layer including a conductive polymer and in contact with the dielectric layer of the anode foil. The electrolyte solution contains at least one of polyalkylene glycol and a derivative of polyalkylene glycol, and at least one of diphenyl amine, naphthol, nitrophenol, catechol, resorcinol, hydroquinone, and pyrogallol.

9 Claims, 3 Drawing Sheets

(51) Int. Cl.

| | | |
|---|---|---|
| *H01G 9/145* | (2006.01) | |
| *H01G 9/035* | (2006.01) | |
| *H01G 11/60* | (2013.01) | |
| *H01G 9/055* | (2006.01) | |
| *H01G 9/07* | (2006.01) | |
| *H01G 9/032* | (2006.01) | |
| *H01G 11/62* | (2013.01) | |
| *H01G 11/64* | (2013.01) | |

(52) U.S. Cl.
CPC ............ *H01G 11/60* (2013.01); *H01G 11/62* (2013.01); *H01G 11/64* (2013.01); *Y02E 60/13* (2013.01); *Y02T 10/7022* (2013.01)

(58) Field of Classification Search
USPC ......................................................... 361/506
See application file for complete search history.

(56) References Cited

U.S. PATENT DOCUMENTS

| | | | |
|---|---|---|---|
| 6,962,612 B1 | 11/2005 | Saito et al. | |
| 7,460,356 B2 | 12/2008 | Ning | |
| 7,497,879 B2 | 3/2009 | Kakuma et al. | |
| 8,023,250 B2 | 9/2011 | Ning et al. | |
| 2004/0095708 A1 | 5/2004 | Takeda et al. | |
| 2006/0062958 A1 | 3/2006 | Yoshida et al. | |
| 2006/0092597 A1 | 5/2006 | Takeda et al. | |
| 2007/0043198 A1 | 2/2007 | Madaj | |
| 2007/0121276 A1 | 5/2007 | Uzawa et al. ................ 361/503 |
| 2008/0247119 A1 | 10/2008 | Kakuma et al. | |
| 2008/0316679 A1 | 12/2008 | Sugihara et al. | |
| 2009/0021893 A1 | 1/2009 | Kakuma et al. | |
| 2009/0086410 A1 | 4/2009 | Tsubaki et al. ............... 361/505 |
| 2009/0161297 A1 | 6/2009 | Kikuchi et al. ............... 361/523 |
| 2009/0290291 A1 | 11/2009 | Yoshimitsu ................... 361/527 |
| 2009/0303664 A1 | 12/2009 | Endoh et al. ................. 361/523 |
| 2010/0053847 A1* | 3/2010 | Tani ...................... H01G 9/035 361/505 |
| 2010/0091431 A1* | 4/2010 | Ito .......................... H01G 9/022 361/504 |
| 2010/0149729 A1 | 6/2010 | Nishioka ....................... 361/525 |
| 2010/0165546 A1* | 7/2010 | Yoshida ............... H01G 9/0036 361/525 |
| 2011/0051323 A1* | 3/2011 | Ning ..................... H01G 9/028 361/527 |

FOREIGN PATENT DOCUMENTS

| | | |
|---|---|---|
| EP | 938108 | 8/1999 |
| JP | 62-268121 | 11/1987 |
| JP | 03-145713 | 6/1991 |
| JP | 05-013276 | 1/1993 |
| JP | 09-063896 | 3/1997 |
| JP | 2695254 B | 12/1997 |
| JP | 10-070046 | 3/1998 |
| JP | 10-106895 | 4/1998 |
| JP | 10106895 A | 4/1998 |
| JP | 11-186110 | 7/1999 |
| JP | 11-283874 | 10/1999 |
| JP | 2000-182898 | 6/2000 |
| JP | 2000-200735 | 7/2000 |
| JP | 2000-269070 | 9/2000 |
| JP | 2002-217067 | 8/2002 |
| JP | 2006-108650 | 4/2006 |
| JP | 2006-120830 | 5/2006 |
| JP | 2006-156890 | 6/2006 |
| JP | 2007-051295 | 3/2007 |
| JP | 2007-080888 | 3/2007 |
| JP | 2007-124524 | 5/2007 |
| JP | 2007-134524 | 5/2007 |
| JP | 2008-010657 | 1/2008 |
| JP | 2008-063433 | 3/2008 |
| JP | 2008-205496 | 9/2008 |
| JP | 2008-235694 | 10/2008 |
| JP | 2008-235895 | 10/2008 |
| JP | 2009-016770 | 1/2009 |
| JP | 2010-067966 | 3/2010 |
| WO | 2007/066822 | 6/2007 |

OTHER PUBLICATIONS

English Translation of Chinese Search Report dated Dec. 3, 2014 for the related Chinese Patent Application No. 201180009576.9.
Partial Translation of "Guideline for transport of polyol" published from Japan Urethane Raw Material Association, Jan. 2009 (4th edition).
International Search Report of PCT Applicaiton No. PCT/JP2011/000660 dated Apr. 26, 2011.

* cited by examiner

ELECTROLYTIC CAPACITOR AND MANUFACTURING METHOD THEREFOR

BACKGROUND

1. Technical Field

The present disclosure relates to an electrolytic capacitor used in various electronic apparatuses.

2. Background Art

With digitalization of electronic apparatuses, there is a demand for capacitors having a small size, a large capacitance, and a small equivalent series resistance (hereinafter, abbreviated as "ESR") in a high frequency region to be used at a power supply output side of circuits such as, for example, a smoothing circuit and a control circuit. As such capacitors, electrolytic capacitors using a fluid electrolyte typically such as an electrolyte solution have been used. Furthermore, recently, solid electrolytic capacitors using a solid electrolyte such as manganese dioxide, a TCNQ complex salt, or an electroconductive polymer such as polypyrrole, polythiophene, and polyaniline have been used.

The solid electrolytic capacitor is excellent in that it has a particularly low ESR as compared with a liquid-type electrolytic capacitor. However, the solid electrolytic capacitor is poor in repairing a defective part in anodic oxide film as a dielectric body. Therefore, leakage current may increase, and, in the worst case, a short circuit may occur.

Meanwhile, particularly, in recent AV apparatuses and automobile electrical equipment, high reliability has been increasingly demanded. Therefore, also in solid electrolytic capacitors, low leakage current and a short-circuit resistance property, in addition to performance such as having a small size, a large capacitance, and a low ESR, are being demanded. In order to meet such demands, a so-called hybrid-type electrolytic capacitor using an electrolyte solution, as material for an electrolyte, that is excellent in repairing a defective part in an anodic oxide film that is a dielectric body in addition to a solid electrolyte such as an electroconductive polymer has been proposed.

FIG. 4 is a sectional view showing a configuration of a hybrid-type electrolytic capacitor (having wound-type capacitor element) as an example of conventional electrolytic capacitor. FIG. 5 is a development perspective view of a capacitor element of the hybrid-type electrolytic capacitor. As shown in FIG. 4, the hybrid-type electrolytic capacitor includes capacitor element 2 as a function element, a pair of lead wires 1A and 1B, and outer package 5. One end portion of each of lead wires 1A and 1B is connected to capacitor element 2. Outer package 5 encloses capacitor element 2 and an electrolyte solution (not shown) in such a manner that the other end portion of each of lead wires 1A and 1B is led to the outside.

Outer package 5 includes bottomed cylindrical case 3 and seal member 4. Case 3 accommodates capacitor element 2 impregnated with the electrolyte solution. Seal member 4 is provided with through holes 4A and 4B through which lead wires 1A and 1B are inserted, respectively. Seal member 4 is compressed by drawing processing part 3A provided on the outer peripheral surface of case 3 so as to seal an opening of case 3. Seal member 4 is made of rubber packing.

As shown in FIG. 5, capacitor element 2 includes anode foil 2A, cathode foil 2B, and separator 2C. Anode foil 2A is formed by roughing a foil made of a valve metal such as aluminum by etching, and forming an anodic oxide film (not shown) as a dielectric body thereon by anodization. Cathode foil 2B is formed of a valve metal such as aluminum. Separator 2C is disposed between anode foil 2A and cathode foil 2B. In this state, anode foil 2A, cathode foil 2B and separator 2C are laminated and wound so as to form capacitor element 2. A solid electrolyte layer (not shown) made of an electroconductive polymer such as polythiophene is formed between anode foil 2A and cathode foil 2B.

One end portion of lead wire 1A is connected to anode foil 2A, and one end portion of lead wire 1B is connected to cathode foil 2B. The other end portions thereof are led out from one end surface of capacitor element 2.

The electrolyte solution includes a solvent, a solute, and additives, and it is based on an electrolyte solution that has been used in a conventional liquid-type electrolytic capacitor using only a liquid electrolyte. The liquid-type electrolytic capacitors are roughly classified into electrolytic capacitors having a low withstand voltage in which a rated voltage is not greater than 100 W.V. and having a low ESR, and electrolytic capacitors having a high withstand voltage in which a rated voltage is, for example, 250 W.V., 350 W.V., and 400 W.V. Mainly, the former electrolytic capacitors are used in a smoothing circuit and a control circuit at the power supply output side, and the latter electrolytic capacitors are used in a smoothing circuit at a power supply input side. These are largely different from each other in various properties of an electrolyte solution to be used in each electrolytic capacitor because roles in the circuit and material compositions are different from each other. Therefore, these electrolyte solutions cannot be used compatibly.

On the other hand, the hybrid-type electrolytic capacitor is used in a smoothing circuit and a control circuit at the power supply output side because it has an ESR as low as that of a solid-type electrolytic capacitor and has a limitation with respect to a withstand voltage. Therefore, a conventional hybrid-type electrolytic capacitor employs an electrolyte solution having high electric conductivity and an excellent low-temperature characteristic, which is applicable for conventional liquid-type electrolytic capacitors. Specific examples of the electrolyte solution is an electrolyte solution including γ-butyrolactone, ethylene glycol or the like as a main solvent, and amidine phthalate, tetramethylammonium phthalate, ammonium adipate, triethylamine phthalate or the like as a solute.

In a conventional hybrid-type electrolytic capacitor configured as mentioned above, an electrolyte solution enters into pores in the solid electrolyte layer of an electroconductive polymer formed in capacitor element 2, and thus, a contact state between a dielectric oxide film and the electrolyte is improved. Therefore, the capacitance is increased, the ESR is lowered, repairing of a defective part in the dielectric oxide film is promoted by the effect of the electrolyte solution, and thus leakage current is reduced. Such an electrolytic capacitor is disclosed in, for example, Japanese Patent Application Unexamined Publication No. H11-186110 and No. 2008-10657.

Electrolytic capacitors used in AV apparatuses and automobile electrical equipment require high reliability over a long period of time. Such electrolytic capacitors are used under a harsh environment at high temperatures, for example, at a maximum working temperature of 85° C. to 150° C. for a long time. Meanwhile, a conventional hybrid-type electrolytic capacitor has a configuration in which an opening of a case accommodating a capacitor element and an electrolyte solution is sealed by sealing material such as rubber and epoxy resin, and therefore lifetime design becomes important.

However, a solvent of the electrolyte solution used in a conventional hybrid-type electrolytic capacitor is a volatile organic solvent such as γ-butyrolactone, ethylene glycol, and sulfolane. Therefore, when the electrolytic capacitor is exposed to a high temperature, the solvent gradually penetrates into a gap between the seal member and the case, a gap between the seal member and the lead wires, or the seal member itself, and gradually vaporizes and volatilizes. In general, an electrolytic capacitor is designed to have a guaranteed lifetime such that a range in which stable properties can be maintained with variation of the physical properties of material to be used or manufacturing conditions taken into consideration. However, if the electrolytic capacitor is used for a long time beyond the guaranteed lifetime, a solvent in the electrolyte solution is finally lost. Therefore, a function of self-repairing a defective part in the dielectric oxide film is lost.

In a conventional liquid-type electrolytic capacitor using only liquid electrolyte, even if the solvent of the electrolyte solution is lost, since the dielectric oxide film and the cathode foil are insulated from each other by the separator, electrolytic capacitor is only to be in an open mode and not in a short circuit.

On the other hand, in the hybrid-type electrolytic capacitor, even if the solvent of the electrolyte solution is lost, an electroconductive solid electrolyte layer remains between the dielectric oxide film and the cathode foil. Therefore, when an effect of the electrolyte solution is lost, an increase in leakage current is caused. As a result, in a worst case, a short circuit occurs.

SUMMARY

A capacitor element of an aspect of the present disclosure includes an anode foil having a dielectric layer on the surface thereof, and a solid electrolyte layer including a conductive polymer and in contact with the dielectric layer of the anode foil. The electrolyte solution includes at least one of polyalkylene glycol and a derivative of polyalkylene glycol, and at least one of diphenyl amine, naphthol, nitrophenol, catechol, resorcinol, hydroquinone, and pyrogallol.

An electrolytic capacitor of another aspect of the present disclosure includes an anode foil having a dielectric layer thereon, a solid electrolyte layer including a conductive polymer and in contact with the dielectric layer, and at least one of polyalkylene glycol and derivatives thereof and at least one of diphenyl amine, naphthol, nitrophenol, catechol, resorcinol, hydroquinone, and pyrogallol, both in contact with the dielectric layer.

According to manufacturing method for an electrolytic capacitor of an aspect of the present disclosure, a capacitor element including an anode foil having a dielectric layer thereon, and a solid electrolyte layer including a conductive polymer and in contact with the dielectric layer is formed, and the capacitor element is impregnated with an electrolyte solution. The solid electrolyte layer is formed by impregnating the capacitor element with a dispersion solution of at least one of polyalkylene glycol and derivatives thereof so that the dielectric layer is in contact with the dispersion solution. The electrolyte solution contains at least one of polyalkylene glycol and derivatives thereof, and at least one of diphenyl amine, naphthol, nitrophenol, catechol, resorcinol, hydroquinone, and pyrogallol.

DETAILED DESCRIPTION OF PREFERRED EMBODIMENTS

Figure 1:
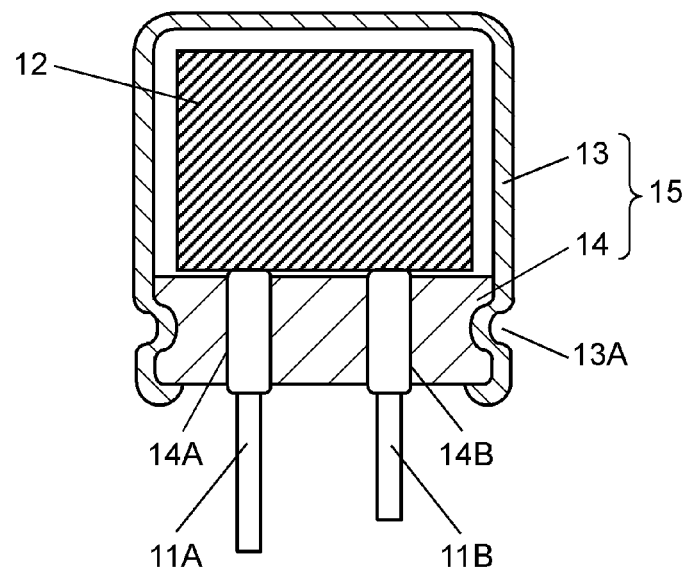
FIG. 1 is a sectional view showing a configuration of a hybrid-type electrolytic capacitor (having wound-type capacitor element) of an example of an electrolytic capacitor in accordance with an exemplary embodiment of the present disclosure.
Figure 2:
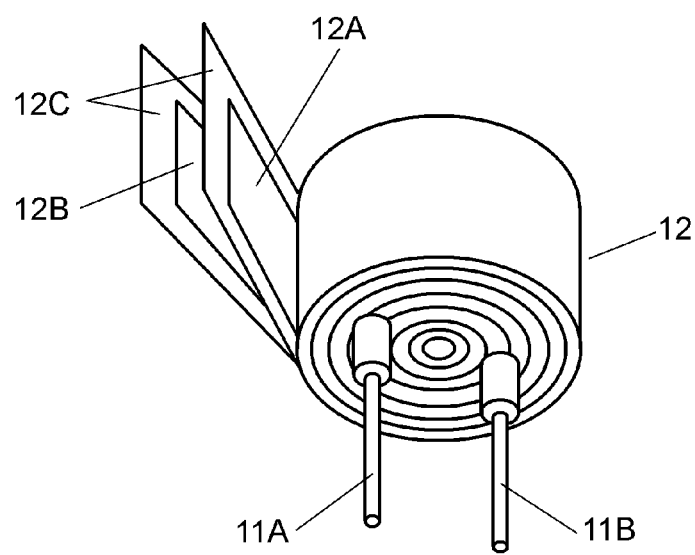
FIG. 2 is a developed perspective view of a capacitor element of the hybrid-type electrolytic capacitor shown in FIG. 1.

Firstly, a configuration of an electrolytic capacitor in accordance with this exemplary embodiment is described with reference to FIGS. 1 and 2. FIG. 1 is a sectional view showing a configuration of a hybrid-type electrolytic capacitor (having wound-type capacitor element) of an example of an electrolytic capacitor in accordance with an exemplary embodiment of the present disclosure, and FIG. 2 is a developed perspective view of a capacitor element of the hybrid-type electrolytic capacitor.

As shown in FIG. 1, the electrolytic capacitor includes capacitor element 12, first lead wire 11A and second lead wire 11B (hereinafter, referred to as "lead wires 11A and 11B"), and outer package 15. As shown in FIG. 2, capacitor element 12 includes anode foil 12A, cathode foil 12B, and separator 12C disposed between anode foil 12A and cathode foil 12B. Lead wire 11A is connected to anode foil 12A, and lead wire 11B is connected to cathode foil 12B. That is to say, one end portion of lead wire 11A is connected to anode foil 12A, and one end portion of lead wire 11B is connected to cathode foil 12B. The other end portions of lead wires 11A and 11B are led out from the same end surface of capacitor element 12. Outer package 15 encloses capacitor element 12 such that the other end portions of lead wires 11A and 11B are led to the outside.

Outer package 15 includes bottomed cylindrical case 13 and seal member 14. Case 13 accommodates capacitor element 12 impregnated with an electrolyte solution mentioned below. Seal member 14 is provided with through holes 14A and 14B through which lead wires 11A and 11B are inserted, respectively. Seal member 14 is disposed at an opening of case 13, and is compressed to seal (close) the opening of case 13 when the outer peripheral surface of case 13 is subjected to drawing processing by drawing processing part 13A.

Figure 3:
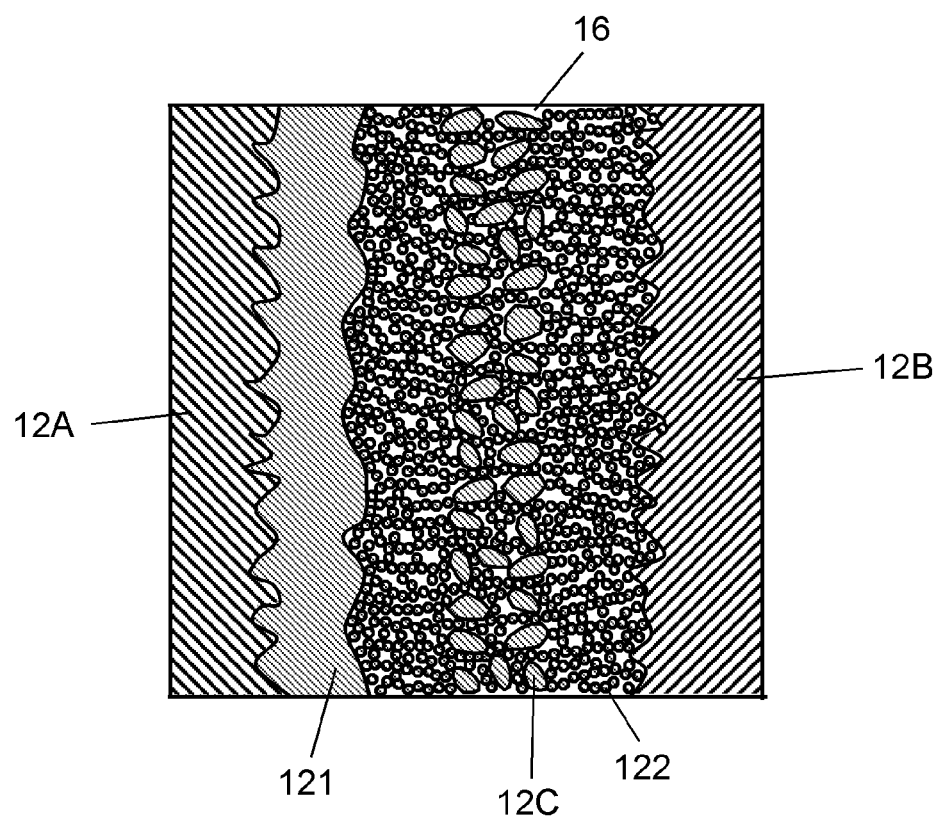
FIG. 3 is an enlarged conceptual view of a principal part of the capacitor element shown in FIG. 2.
Figure 4:
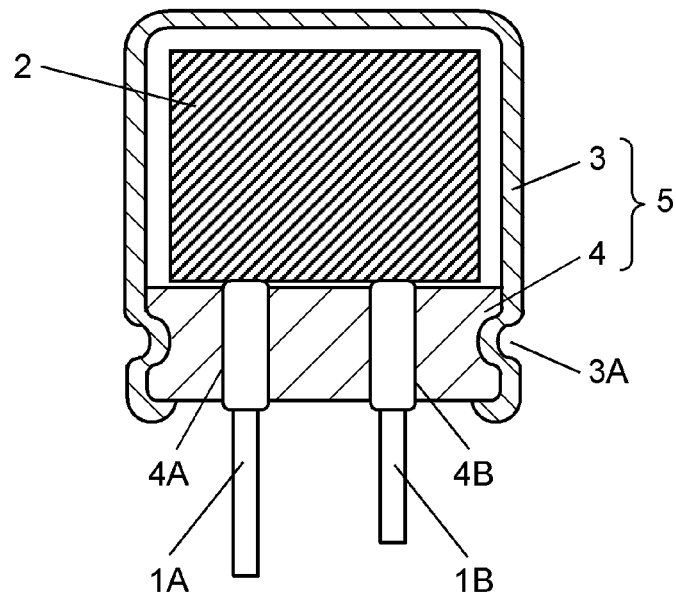
FIG. 4 is a sectional view showing a configuration of a hybrid-type electrolytic capacitor (having wound-type capacitor element) of an example of a conventional electrolytic capacitor.
Figure 5:
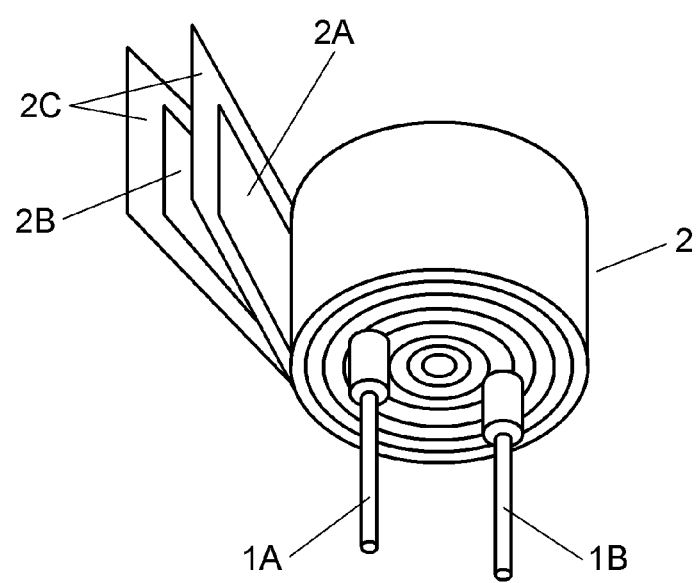
FIG. 5 is a developed perspective view of a capacitor element of the hybrid-type electrolytic capacitor shown in FIG. 4.

Next, a configuration of the capacitor element is described with reference to FIG. 3. FIG. 3 is an enlarged conceptual view of a principal part of the capacitor element shown in FIG. 2. Capacitor element 12 includes solid electrolyte layer 122 in addition to the above-mentioned anode foil 12A, cathode foil 12B and separator 12C. Furthermore, capacitor element 12 is impregnated with electrolyte solution 16.

Anode foil 12A is formed by roughing a foil made of a valve metal such as aluminum by etching, and forming a dielectric anodic oxide film thereon by anodization. That is to say, anode foil 12A has dielectric layer 121 on the surface thereof. Cathode foil 12B is formed of a valve metal such as aluminum. Anode foil 12A and cathode foil 12B are laminated and wound with separator 12C interposed therebetween. Furthermore, solid electrolyte layer 122 made of an electroconductive polymer such as polythiophene and derivatives thereof is formed between anode foil 12A and cathode foil 12B. That is to say, solid electrolyte layer 122 is in contact with dielectric layer 121 and cathode foil 12B. Solid electrolyte layer 122 is not dense but porous such that there are pores inside thereof, and electrolyte solution 16 enters into the pores.

Note here that capacitor element 12 may be configured by laminating a plurality of anode foils 12A and cathode foils 12B via separators 12C.

Seal member 14 can be made by using resin material such as an epoxy resin in addition to rubber material such as EPT and IIR. Separator 12C can be made by using a nonwoven fabric containing cellulose, kraft, polyethylene terephthalate, polybutylene terephthalate, polyphenylene sulfide, nylon, aromatic polyamide, polyimide, polyamide-imide, polyether imide, rayon, and glass.

Electrolyte solution 16 is prepared by dissolving a solute in a solvent. Examples of the solute include an ammonium salt of inorganic acid, an amine salt of inorganic acid, and an alkyl-substituted amidine salt of inorganic acid or quaternized products thereof, as well as an ammonium salt of organic acid, an amine salt of organic acid, and an alkyl-substituted amidine salt of organic acid or quaternized products thereof. Examples of inorganic acid compounds include a boric acid compound, a phosphoric acid compound, and the like. Examples of organic acid compounds include aliphatic carboxylic acid such as adipic acid, and aromatic carboxylic acid such as phthalic acid, benzoic acid, salicylic acid, trimellitic acid, and pyromellitic acid. Examples of ammonium compounds include ammonia, and dihydroxy ammonium; and examples of amine compounds include triethyl amine, methyl diethyl amine, trishydroxymethyl amino methane, and the like. Examples of the alkyl-substituted amidine salt or the quaternized products thereof include a quaternized product of 1,2,3,4-tetramethyl imidazolinium and compounds such as 1-ethyl-2,3-dimethyl imidazolinium and 1-ethyl-3-methyl imidazolium.

Electrolyte solution 16 includes at least one low-volatile solvent selected from polyalkylene glycol and a derivative of polyalkylene glycol as solvent material. Polyalkylene glycols are substantially non-volatile (low-volatile). Specific examples include polyethylene glycol, polyethylene glycol glyceryl ether or polyethylene glycol diglyceryl ether or polyethylene glycol sorbitol ether, polypropylene glycol, polypropylene glycol glyceryl ether, polypropylene glycol diglyceryl ether, polypropylene glycol sorbitol ether, polybutylene glycol, copolymers of ethylene glycol and propylene glycol, copolymers of ethylene glycol and butylene glycol, and copolymers of propylene glycol and butylene glycol. These can be used singly or in combination of two or more of them.

Furthermore, among polyalkylene glycol or derivatives thereof, in particular, polyethylene glycol or derivatives thereof hardly evaporate in the below-mentioned acceleration test and, in other words, they exhibit extremely great low-volatility, when the mean molecular weight is 300 or more. Meanwhile, when the mean molecular weight is more than 1000, although the low-volatility is maintained, viscosity is increased and an effective capacitance rate is lowered, and it is largely lowered particularly at a low temperature. Therefore, an optimum mean molecular weight is in a range from 300 to 1000, inclusive.

Furthermore, since polypropylene glycol or derivative thereof have a large propylene structure as a basic unit, they hardly evaporate in the same acceleration test and exhibit extremely great low-volatility when the mean molecular weight is 200 or more. Meanwhile, since the propylene structure is more hydrophobic than the ethylene structure, the viscosity can be kept low until the mean molecular weight is about 5000. Therefore, the effective capacitance rate of the capacitor at low temperature is excellent. However, when the mean molecular weight is more than 5000, the low volatility is obtained but the viscosity is increased, and thus the effective capacitance rate of the capacitor is lowered and it is largely lowered particularly at a low temperature. Therefore, an optimum mean molecular weight is in a range from 200 to 5000, inclusive.

In a single polymerized product (homopolymer) such as polyethylene glycol or polypropylene glycol, the molecular weight can be controlled easily at the time of polymerization. Therefore, molecular weight distribution is stabilized, excellent thermal stability can be exhibited, and the long lifetime can be achieved. Furthermore, in the case of a polymerized product having a molecular weight of 200 or more, the interaction between molecules becomes stronger and thus the thermal stability is more improved. Therefore, such a polymerized product is optimum for capacitors having a long guaranteed lifetime.

As mentioned above, an electrolyte solution, which has been used in a conventional hybrid-type electrolytic capacitor used in a smoothing circuit or a control circuit at the power supply output side, includes a volatile organic solvent such as γ-butyrolactone and ethylene glycol as a solvent. Therefore, if a conventional hybrid-type electrolytic capacitor is continued to be used under a high-temperature environment of a maximum working temperature of 85° C. to 150° C. for a long time beyond the guaranteed lifetime, the solvent of electrolyte solution 16 is lost by vaporization and volatilization. As a result, an effect of repairing a dielectric oxide film cannot be exhibited.

On the other hand, the electrolytic capacitor in accordance with this exemplary embodiment includes liquid-state polyalkylene glycol as a low-volatile solvent. This liquid-state polyalkylene glycol hardly volatilizes even under a high-temperature environment of a maximum working temperature of 85° C. to 150° C. Consequently, even if it is used under a high temperature as mentioned above for a long time beyond the guaranteed lifetime, electrolyte solution 16 can be allowed to remain in capacitor element 12. Therefore, the repairing effect of the dielectric oxide film can be maintained.

Furthermore, the content of polyalkylene glycol or derivatives thereof as the low-volatile solvent in electrolyte solution 16 is 15 wt. % or more, this low-volatile solvent can cover an entire part of the dielectric oxide film on the surface of anode foil 12A. Furthermore, this low-volatile solvent can move along separator 12C and a solid electrolyte existing between the dielectric oxide film and cathode foil 12B and reach cathode foil 12B. Consequently, defective parts over the dielectric oxide film can be repaired, and thus an extremely excellent short-circuit resistance property can be exhibited.

As the upper limit of the content of polyalkylene glycol or derivatives thereof, all of the solvent excluding a solute and additives may be liquid state polyalkylene glycol or derivatives thereof. However, as the impregnation property of electrolyte solution 16 into capacitor element 12 is taken into consideration, electrolyte solution 16 may be prepared by mixing the other solvents, for example, γ-butyrolactone, ethylene glycol, and sulfolane, having volatility and low viscosity.

Furthermore, solid electrolyte layer 122 is an electroconductive polymer such as polythiophene or derivatives thereof, for example, poly(3,4-ethylenedioxythiophene). The electroconductive polymer incorporates dopant. The dopant has a role of expressing electric conductivity. As the typical dopant, acids such as p-toluenesulfonic acid and polystyrenesulfonic acid are used.

However, when dedoping proceeds because an electroconductive polymer is exposed to an alkaline atmosphere due to electrolysis of water existing in the surroundings, or because an electroconductive polymer reacts with a base component in electrolyte solution 16, the conductivity may be lowered. Thus, it is preferable that the dissolved components such as a solute and additives dissolved in the low-volatile solvent include more of the acid than the base. Thanks to the more acid, since the surrounding environment of solid electrolyte layer 122 continues to be maintained at the acidic state by electrolyte solution 16, dedoping is suppressed, and change in the ESR of the electrolytic capacitor can be reduced. Furthermore, since polyalkylene glycol or derivatives thereof continue to remain as the solvent, the solute and the additives can continue to exhibit their functions in the solvent.

Examples of acids constituting these dissolved components include aromatic organic carboxylic acid, for example, phthalic acid, benzoic acid, nitrobenzoic acid, salicylic acid, trimellitic acid, and pyromellitic acid. Among them, trimellitic acid and pyromellitic acid containing at least three carboxyl groups are particularly preferable because they have a larger number of carboxyl groups and can be more acidic as compared with conventional phthalic acid. Furthermore, inorganic acid such as boric acid and phosphoric acid and compounds thereof are more stable even at a high temperature. Furthermore, since a complex of mannitol and boric acid is more acidic, it exhibits a special advantageous effect with respect to a dedoping reaction at a high temperature.

When a strongly acidic solute or additives are used, dedoping can be suppressed efficiently. However, there is a problem that aluminum as an electrode body is dissolved with the strongly acidic solute or additives. Therefore, in order to ensure reliability, it is important to control the dedoping reaction by selecting weak acid such as organic carboxylic acid and boric acid.

Furthermore, electrolyte solution 16 can contain appropriate additives for the purpose of absorbing gas, stabilizing a withstand voltage, adjusting pH, preventing oxidization, and the like. For example, polyalkylene glycol and/or derivatives thereof may contain an oxidation inhibitor. As the oxidation inhibitor, amine-based oxidation inhibitors, benzotriazole-based oxidation inhibitors, phenol-based oxidation inhibitors, and phosphorus-based oxidation inhibitors are effective for applications of use of capacitors. Examples thereof include diphenyl amine, naphthol, nitrophenol, catechol, resorcinol, hydroquinone, pyrogallol, and the like. Among them, hydroquinone and pyrogallol include a plurality of OH groups, and have a high oxidation inhibiting effect. Such additives may be used singly or in combination thereof.

Next, a method for manufacturing the electrolytic capacitor configured as mentioned above in accordance with an exemplary embodiment is described with reference to FIGS. 1 and 2. Firstly, anode foil 12A having dielectric layer 121 of oxide film on the surface thereof and made of a valve metal such as aluminum, cathode foil 12B and separator 12C are cut into a predetermined width and length. Then, one end portions of lead wires 11A and 11B are respectively connected to anode foil 12A and cathode foil 12B by a method such as caulking, or a method using ultrasonic waves. After that, as shown in FIG. 2, anode foil 12A and cathode foil 12B are wound in a roll form with separator 12C interposed therebetween to be formed into an approximately cylindrical shape, and the side surface of the outer periphery is fixed with insulating tape and the like (not shown). Thus, capacitor element 12 is formed.

Note here that it is preferable that the surface of anode foil 12A is subjected to etching, vapor deposition of metal particles, or the like, so that the surface area of anode foil 12A is appropriately enlarged. Dielectric layer 121 made of an oxide film is formed as a dielectric oxide film by subjecting a valve metal such as aluminum as electrode material to anodic oxidation. In addition, dielectric layer 121 may be formed on electrode material by vapor deposition or coating.

Note here that it is preferable that the surface of cathode foil 12 B is subjected to surface treatment such as etching, formation of an oxide film, vapor deposition of metal particles, and attachment of electrically conductive particles such as carbon, if necessary, in order to improve the contact state with respect to solid electrolyte layer 122.

After that, an oxide film on the surface of anode foil 12A may be repaired by applying a voltage to lead wires 11A and 11B after immersing the formed capacitor element 12 in an anodization solution.

Next, lead wires 11A and 11B led out from capacitor element 12 are inserted into through holes 14A and 14B provided in seal member 14, respectively, and seal member 14 is mounted on capacitor element 12. Seal member 14 may be mounted before capacitor element 12 is immersed in an anodization solution.

After that, solid electrolyte layer 122 is formed between anode foil 12A and cathode foil 12B of capacitor element 12. For solid electrolyte layer 122, for example, poly(3,4-ethylenedioxythiophene) (PEDOT) as an electroconductive polymer is used. In this case, electrolyte layer 122 is formed by, for example, allowing capacitor element 12 to be impregnated with a dispersion solution in which PEDOT is dispersed, followed by lifting up capacitor element 12 and drying thereof. Alternatively, PEDOT may be formed by a chemical polymerization reaction in capacitor element 12 by using a solution of a monomer such as 3,4-ethylenedioxythiophene, an oxidizer solution containing ferric p-toluenesulfonate and the like, and ethanol and the like as a solvent, and impregnating capacitor element 12 with these solutions.

Next, capacitor element 12 is accommodated in case 13 together with electrolyte solution 16 and disposed at an opening of case 13. In order to allow capacitor element 12 to be impregnated with electrolyte solution 16, a predetermined amount of electrolyte solution 16 is previously injected in case 13, and capacitor element 12 is impregnated with electrolyte solution 16 when it is accommodated in case 13. Alternatively, capacitor element 12 may be immersed in an impregnation tank storing electrolyte solution 16 and lifted up, and then it may be accommodated in case 13. Furthermore, the pressure of the surrounding may be occasionally reduced at the time of impregnation. Note here that an excess amount of electrolyte solution 16 that cannot be used for impregnation of capacitor element 12 may be kept in case 13.

Next, drawing processing part 13A is formed by winding and tightening case 13 from the outer peripheral side surface, thereby an opening of case 13 is sealed. As an outer package, capacitor element 12 is covered with an insulating coating resin made of, for example, an epoxy resin, and the other end portions of lead wires 11A and 11B may be led to the outer part of the outer package material.

Furthermore, an electrolytic capacitor may be, for example, a surface mount type as mentioned below. Firstly, an insulating terminal plate (not shown) is disposed so that it is in contact with an opening of case 13. Then, the other end portions of lead wires 11A and 11B led out from the outer surface of seal member 14 sealing the opening of case 13 are inserted into a pair of through holes (not shown) provided in the insulating terminal plate. Then, lead wires 11A and 11B are bent at about a right angle in mutually different directions and accommodated in recess portions (not shown) provided on the outer surface of the insulating terminal plate.

Note here that after the opening of case 13 is sealed, or after the insulating terminal plate is attached, a voltage may be applied appropriately between lead wires 11A and 11B, and thus, re-anodization may be carried out.

As mentioned above, an electrolytic capacitor in this exemplary embodiment includes electrolyte solution 16 containing polyalkylene glycol or derivatives thereof, and solid electrolyte layer 122 of, for example, an electroconductive polymer. Therefore, an electrolytic capacitor having a small size, a large capacitance, and a low ESR is achieved. The volatility of polyalkylene glycol or derivatives thereof is extremely low. Therefore, even if the electrolytic capacitor is used under a high-temperature environment of a maximum working temperature of 85° C. to 150° C. for a long time beyond the guaranteed lifetime, electrolyte solution 16 having an effect of repairing a defective part occurring in a dielectric oxide film can be continued to be maintained. As a result, in the electrolytic capacitor in this exemplary embodiment, an increase in leakage current is suppressed and an excellent short-circuit resistance property can be ensured.

Hereinafter, advantageous effects of this exemplary embodiment are described with reference to specific samples E1 to E18.

(Sample E1)

As sample E1 of an electrolytic capacitor in accordance with an exemplary embodiment of the present disclosure, a hybrid-type electrolytic capacitor having a wound-type capacitor element (diameter: 6.3 mm, height: 5.8 mm, and guaranteed lifetime: 5,000 hours at 105° C.) having a rated voltage of 35 V and a capacitance of 27 µF is prepared.

Firstly, as shown in FIG. 2, anode foil 12A made of aluminum and having dielectric layer 121 of aluminum oxide film on the surface thereof, cathode foil 12B, and separator 12C are cut into a predetermined width and length. Then, one end portions of lead wires 11A and 11B are respectively connected to anode foil 12A and cathode foil 12B by needle-caulking. After that, anode foil 12A and cathode foil 12B are wound in a roll form with separator 12C interposed therebetween to be formed into an approximately cylindrical shape. Furthermore, the outer peripheral side surface is fixed with insulating tape (not shown). Thus, capacitor element 12 is formed.

Note here that the surface area of anode foil 12A is enlarged by an etching process. Furthermore, dielectric layer 121 made of aluminum oxide film is formed by an anodic oxidation process. Also, the surface area of cathode foil 12B is enlarged by an etching process. Note here that separator 12C is made of a nonwoven fabric mainly containing cellulose.

Next, lead wires 11A and 11B led out from capacitor element 12 are inserted into through holes 14A and 14B provided in seal member 14 of rubber packing, and seal member 14 is mounted on capacitor element 12.

After that, capacitor element 12 is immersed in an anodization solution that is kept at 60° C., a voltage of 63 V is applied between lead wires 11A and 11B for 10 minutes, and thus, an oxide film on the surface of anode foil 12A is repaired.

Next, solid electrolyte layer 122 made of poly(3,4-ethylenedioxythiophene) (PEDOT) is formed between anode foil 12A and cathode foil 12B of capacitor element 12. Specifically, after capacitor element 12 is impregnated with a dispersion solution in which PEDOT is dispersed in an aqueous solution, capacitor element 12 is lifted up and dried at 110° C. for 30 minutes. In the PEDOT, polystyrene sulfonic acid is used as dopant.

On the other hand, various electrolyte solutions shown in Tables 1 to 4 are prepared. Among them, electrolyte solution B is injected into bottomed cylindrical case 13 made of aluminum. Electrolyte solution B contains ethyldimethylamine phthalate, and 5 wt. % of polyethylene glycol (molecular weight: 300) as a solvent.

TABLE 1

| electrolyte solution | PEG(wt %) | GBL(wt %) | SL(wt %) |
|---|---|---|---|
| A | 0 | 50 | 25 |
| B | 5 | 45 | 25 |
| C | 10 | 40 | 25 |
| D | 15 | 35 | 25 |
| E | 50 | 0 | 25 |
| F | 75 | 0 | 0 |

PEG: polyethylene glycol (molecular weight: 300)
GBL: γ-butyrolactone
SL: sulfolane
*Each electrolyte solution contains 24 wt % of ethyldimethylamine phthalate and 1 wt % of nitrobenzoic acid.

TABLE 2

| electrolyte solution | molecular weight of polyethylene glycol |
|---|---|
| G | 200 |
| H | 400 |
| I | 600 |
| J | 1000 |
| K | 1500 |
| L | 2000 |

* The composition is as following: 15 wt % of polyethylene glycol, 35 wt % of γ-butyrolactone, 25 wt % of sulfolane, 24 wt % of ethyldimethylamine phthalate and 1 wt % of nitrobenzoic acid.

TABLE 3

| electrolyte solution | FEDMA (wt %) | NBA (wt %) | boric acid (wt %) | PA (wt %) | PG (wt %) |
|---|---|---|---|---|---|
| M | 20 | 1 | 4 | — | — |
| N | 20 | 1 | — | 4 | — |
| O | 16 | 1 | — | 4 | 4 |

FEDMA: ethyldimethylamine phthalate
NBA: nitrobenzoic acid
PA: pyromellitic acid
PG: pyrogallol
* Each electrolyte solution contains 15 wt % of polyethylene glycol (molecular weight: 300), 35 wt % of γ-butyrolactone and 25 wt % sulfolane.

TABLE 4

| electrolyte solution | molecular weight of polypropylene glycol |
|---|---|
| P | 100 |
| Q | 200 |

TABLE 4-continued

| electrolyte solution | molecular weight of polypropylene glycol |
|---|---|
| R | 5000 |
| S | 6000 |

\* The composition is as following: 15 wt % of polypropylene glycol, 35 wt % of γ-butyrolactone, 25 wt % of sulfolane, 24 wt % of ethyldimethylamine phthalate and 1 wt % of nitrobenzoic acid.

Then, capacitor element 12 is inserted into case 13, capacitor element 12 is impregnated with electrolyte solution 16, and seal member 14 mounted on capacitor element 12 is disposed at an opening of case 13.

Next, case 13 is wound and tightened from the outer peripheral side surface around the opening to form drawing processing part 13A, thus generating a compressive stress on seal member 14 that is a rubber elastic body. Thus, an opening of case 13 is sealed.

Thereafter, re-anodization is carried out by applying a voltage of 40 V between lead wires 11A and 11B led out to the outside for 60 minutes. Thus, an electrolytic capacitor of sample E1 is produced.

Relative to the configuration of sample E1, in samples E2 to E18, compositions of the electrolyte solution are changed, and electrolyte solutions C to S shown in Tables 1 to 4 are used, respectively. In samples E2 to E5 (electrolyte solutions C to F), the ratio (wt. %) of polyethylene glycol contained in electrolyte solution 16 is changed. In samples E6 to E11 (electrolyte solutions G to L), the molecular weight of polyethylene glycol is changed. In samples E12 to E14 (electrolyte solutions M to O), a solute and additives are further added. In samples E15 to E18 (electrolyte solutions P to S), polyalkylene glycol contained in electrolyte solution 16 is polypropylene glycol, and the molecular weight of polypropylene glycol is changed. Hereinafter, samples E2 to E18 are described in detail.

(Sample E2)

As sample E2, a hybrid-type electrolytic capacitor including a wound-type capacitor element and having a rated voltage of 35 V and a capacitance of 27 μF is produced in the same manner as in sample E1 except that electrolyte solution C shown in Table 1 is used instead of electrolyte solution B used in sample E1, and electrolyte solution C contains ethyldimethylamine phthalate and nitrobenzoic acid and contains 10 wt. % of polyethylene glycol (molecular weight: 300) as a solvent.

(Sample E3)

As sample E3, a hybrid-type electrolytic capacitor including a wound-type capacitor element and having a rated voltage of 35 V and a capacitance of 27 μF is produced in the same manner as in sample E1 except that electrolyte solution D shown in Table 1 is used instead of electrolyte solution B used in sample E1, and electrolyte solution D contains ethyldimethylamine phthalate and nitrobenzoic acid and contains 15 wt. % of polyethylene glycol (molecular weight: 300) as a solvent.

(Sample E4)

As sample E4, a hybrid-type electrolytic capacitor including a wound-type capacitor element and having a rated voltage of 35 V and a capacitance of 27 μF is produced in the same manner as in sample E1 except that electrolyte solution E shown in Table 1 is used instead of electrolyte solution B used in sample E1, and electrolyte solution E contains ethyldimethylamine phthalate and nitrobenzoic acid, and contains 50 wt. % of polyethylene glycol (molecular weight: 300) as a solvent.

(Sample E5)

As sample E5, a hybrid-type electrolytic capacitor including a wound-type capacitor element and having a rated voltage of 35 V and a capacitance of 27 μF is produced in the same manner as in sample E1 except that electrolyte solution F shown in Table 1 is used instead of electrolyte solution B used in sample E1, and electrolyte solution F contains ethyldimethylamine phthalate and nitrobenzoic acid, and contains 75 wt. % of polyethylene glycol (molecular weight: 300) as a solvent.

(Sample E6)

As sample E6, a hybrid-type electrolytic capacitor including a wound-type capacitor element and having a rated voltage of 35 V and a capacitance of 27 μF is produced in the same manner as in sample E3 except that electrolyte solution G shown in Table 2 is used instead of electrolyte solution D used in sample E3, and the molecular weight of polyethylene glycol is changed from 300 to 200 in electrolyte solution G as compared with electrolyte solution D.

(Sample E7)

As sample E7, a hybrid-type electrolytic capacitor including a wound-type capacitor element and having a rated voltage of 35 V and a capacitance of 27 μF is produced in the same manner as in sample E3 except that electrolyte solution H shown in Table 2 is used instead of electrolyte solution D used in sample E3, and the molecular weight of polyethylene glycol is changed from 300 to 400 in electrolyte solution H as compared with electrolyte solution D.

(Sample E8)

As sample E8, a hybrid-type electrolytic capacitor including a wound-type capacitor element and having a rated voltage of 35 V and a capacitance of 27 μF is produced in the same manner as in sample E3 except that electrolyte solution I shown in Table 2 is used instead of electrolyte solution D used in sample E3, and the molecular weight of polyethylene glycol is changed from 300 to 600 in electrolyte solution I as compared with electrolyte solution D.

(Sample E9)

As sample E9, a hybrid-type electrolytic capacitor including a wound-type capacitor element and having a rated voltage of 35 V and a capacitance of 27 μF is produced in the same manner as in sample E3 except that electrolyte solution J shown in Table 2 is used instead of electrolyte solution D used in sample E3, and the molecular weight of polyethylene glycol is changed from 300 to 1000 in electrolyte solution J as compared with electrolyte solution D.

(Sample E10)

As sample E10, a hybrid-type electrolytic capacitor including a wound-type capacitor element and having a rated voltage of 35 V and a capacitance of 27 μF is produced in the same manner as in sample E3 except that electrolyte solution K shown in Table 2 is used instead of electrolyte solution D used in sample E3, and the molecular weight of polyethylene glycol is changed from 300 to 1500 in electrolyte solution K as compared with electrolyte solution D.

(Sample E11)

As sample E11, a hybrid-type electrolytic capacitor including a wound-type capacitor element and having a rated voltage of 35 V and a capacitance of 27 μF is produced in the same manner as in sample E3 except that electrolyte solution L shown in Table 2 is used instead of electrolyte solution D used in sample E3, and the molecular weight of polyethylene glycol is changed from 300 to 2000 in electrolyte solution L as compared with electrolyte solution D.

(Sample E12)

As sample E12, a hybrid-type electrolytic capacitor including a wound-type capacitor element and having a rated voltage of 35 V and a capacitance of 27 µF is produced in the same manner as in sample E3 except that electrolyte solution M shown in Table 3 is used instead of electrolyte solution D used in sample E3, and as compared with electrolyte solution D, electrolyte solution M additionally contains boric acid (4 wt. %) and the weight content of ethyldimethylamine phthalate is reduced by the that of boric acid.

(Sample E13)

As sample E13, a hybrid-type electrolytic capacitor including a wound-type capacitor element and having a rated voltage of 35 V and a capacitance of 27 µF is produced in the same manner as in sample E3 except that electrolyte solution N shown in Table 3 is used instead of electrolyte solution D used in sample E3, and as compared with electrolyte solution D, electrolyte solution N additionally contains pyromellitic acid (4 wt. %) and the weight content of ethyldimethylamine phthalate is reduced by that of pyromellitic acid.

(Sample E14)

As sample E14, a hybrid-type electrolytic capacitor including a wound-type capacitor element and having a rated voltage of 35 V and a capacitance of 27 µF is produced in the same manner as in sample E3 except that electrolyte solution O shown in Table 3 is used instead of electrolyte solution D used in sample E3, and as compared with electrolyte solution D, electrolyte solution O additionally contains pyromellitic acid (4 wt. %) and pyrogallol (4 wt. %), and the weight contents of ethyldimethylamine phthalate is reduced by that of pyromellitic acid and pyrogallol.

(Sample E15)

As sample E15, a hybrid-type electrolytic capacitor including a wound-type capacitor element and having a rated voltage of 35 V and a capacitance of 27 µF is produced in the same manner as in sample E3 except that electrolyte solution P shown in Table 4 is used instead of electrolyte solution D used in sample E3, and polyalkylene glycol contained in the electrolyte solution is changed from polyethylene glycol (molecular weight: 300) to polypropylene glycol (molecular weight: 100) in electrolyte solution P as compared with electrolyte solution D.

(Sample E16)

As sample E16, a hybrid-type electrolytic capacitor including a wound-type capacitor element and having a rated voltage of 35 V and a capacitance of 27 µF is produced in the same manner as in sample E15 except that electrolyte solution Q shown in Table 4 is used instead of electrolyte solution P used in sample E15, and polyalkylene glycol contained in the electrolyte solution is changed from polypropylene glycol (molecular weight: 100) to polypropylene glycol (molecular weight: 200) in electrolyte solution Q as compared with electrolyte solution P.

(Sample E17)

As sample E17, a hybrid-type electrolytic capacitor including a wound-type capacitor element and having a rated voltage of 35 V and a capacitance of 27 µF is produced in the same manner as in sample E15 except that electrolyte solution R shown in Table 4 is used instead of electrolyte solution P used in sample E15, and polyalkylene glycol contained in the electrolyte solution is changed from polypropylene glycol (molecular weight: 100) to polypropylene glycol (molecular weight: 5000) in electrolyte solution R as compared with electrolyte solution P.

(Sample E18)

As sample E18, a hybrid-type electrolytic capacitor including a wound-type capacitor element and having a rated voltage of 35 V and a capacitance of 27 µF is produced in the same manner as in sample E15 except that electrolyte solution S shown in Table 4 is used instead of electrolyte solution P used in sample E15, and polyalkylene glycol contained in the electrolyte solution is changed from polypropylene glycol (molecular weight: 100) to polypropylene glycol (molecular weight: 6000) in electrolyte solution S as compared with electrolyte solution P.

Furthermore, electrolytic capacitors are produced for comparison with samples E1 to E18. Sample C1 is a hybrid-type electrolytic capacitor which does not contain polyethylene glycol in an electrolyte solution. Sample C2 is a solid-type electrolytic capacitor which includes a solid electrolyte of PEDOT as an electrolyte, and which does not includes an electrolyte solution. Sample C3 is a liquid-type electrolytic capacitor which includes only an electrolyte solution that does not contain polyethylene glycol, as an electrolyte. In other words, sample C3 does not include a solid electrolyte. Also, sample C3 is configured to be used for electrolytic capacitors having a low withstand voltage in which a rated voltage is at most 100 W.V. and has a low ESR, which is used in a smoothing circuit and a control circuit at the power supply output side.

Note here that for comparison, as samples C4 to C7, liquid-type electrolytic capacitors, which include, as an electrolyte, only an electrolyte solution containing polyethylene glycol and which does not include a solid electrolyte are produced. Hereinafter, these samples C1 to C7 are described.

(Sample C1)

As sample C1, a hybrid-type electrolytic capacitor including a wound-type capacitor element and having a rated voltage of 35 V and a capacitance of 27 µF is produced in the same manner as in sample E1 except that electrolyte solution A shown in Table 1 is used instead of electrolyte solution B used in sample E1, and as compared with electrolyte solution B, electrolyte solution A does not contain polyethylene glycol in a solvent and the weight content of γ-butyrolactone is increased by that of polyethylene glycol.

(Sample C2)

Sample C2 includes only a solid electrolyte made of PEDOT without including electrolyte solution B used in sample E1. With such a configuration, a solid-type electrolytic capacitor including a wound-type capacitor element and having a rated voltage of 35 V and a capacitance of 27 µF is produced.

(Sample C3)

As sample C3, a hybrid-type electrolytic capacitor including a wound-type capacitor element and having a rated voltage of 35 V and a capacitance of 27 µF is produced in the same manner as in sample E1 except that solid electrolyte made of PEDOT used in sample E1 is not included and electrolyte solution A shown in Table 1 is used instead of electrolyte solution B, and as compared with electrolyte solution B, electrolyte solution A does not contain polyethylene glycol in a solvent and the weight content of γ-butyrolactone is increased by that of polyethylene glycol.

(Sample C4)

As sample C4, a hybrid-type electrolytic capacitor including a wound-type capacitor element and having a rated voltage of 35 V and a capacitance of 27 µF is produced in the same manner as in sample C3 except that electrolyte solution B shown in Table 1 is used instead of electrolyte solution A used in sample C3, and as compared with electrolyte solution A, electrolyte solution B contains 5 wt % of polyethylene glycol in a solvent and the weight content of γ-butyrolactone is reduced by that of polyethylene glycol.

(Sample C5)

As sample C5, a hybrid-type electrolytic capacitor including a wound-type capacitor element and having a rated voltage of 35 V and a capacitance of 27 μF is produced in the same manner as in sample C3 except that electrolyte solution C shown in Table 1 is used instead of electrolyte solution A used in sample C3, and as compared with electrolyte solution A, electrolyte solution C contains 10 wt % of polyethylene glycol in a solvent and the weight content of γ-butyrolactone is reduced by that of polyethylene glycol.

(Sample C6)

As sample C6, a hybrid-type electrolytic capacitor including a wound-type capacitor element and having a rated voltage of 35 V and a capacitance of 27 μF is produced in the same manner as in sample C3 except that electrolyte solution D shown in Table 1 is used instead of electrolyte solution A used in sample C3, and as compared with electrolyte solution A, electrolyte solution D contains 15 wt % of polyethylene glycol in a solvent and the weight content of γ-butyrolactone is reduced by that of polyethylene glycol.

(Sample C7)

As sample C7, a hybrid-type electrolytic capacitor including a wound-type capacitor element and having a rated voltage of 35 V and a capacitance of 27 μF is produced in the same manner as in sample C3 except that electrolyte solution E shown in Table 1 is used instead of electrolyte solution A used in sample C3, and as compared with electrolyte solution A, electrolyte solution E contains 50 wt % of polyethylene glycol in a solvent and the weight content γ-butyrolactone is reduced by that of polyethylene glycol.

Configurations of the solid electrolytes and the electrolyte solutions in the electrolytic capacitors in the above-mentioned samples E1 to E18 and samples C1 to C7 are shown in Table 5. Furthermore, 30 samples of electrolytic capacitors of each of samples E1 to E18 and samples C1 to C7 are produced, and the initial properties are measured. The measurement results are shown in Table 6.

As the initial properties, capacitance values, ESR values, and leakage current values are measured and the average values thereof are calculated. The capacitance value is measured at 120 Hz, the ESR value is measured at 100 kHz, and the leakage current value is measured as a value after the rated voltage is applied for two minutes. Measurement is carried out in a 20° C. environment.

TABLE 5

| sample | solid electrolyte layer | electrolyte solution | remarks |
|---|---|---|---|
| E1 | PEDOT | B | PEG(Mw300)5 wt % |
| E2 | PEDOT | C | PEG(Mw300)10 wt % |
| E3 | PEDOT | D | PEG(Mw300)15 wt % |
| E4 | PEDOT | E | PEG(Mw300)50 wt % |
| E5 | PEDOT | F | PEG(Mw300)75 wt % |
| E6 | PEDOT | G | PEG(Mw200)15 wt % |
| E7 | PEDOT | H | PEG(Mw400)15 wt % |
| E8 | PEDOT | I | PEG(Mw600)15 wt % |
| E9 | PEDOT | J | PEG(Mw1000)15 wt % |
| E10 | PEDOT | K | PEG(Mw1500)15 wt % |
| E11 | PEDOT | L | PEG(Mw2000)15 wt % |
| E12 | PEDOT | M | PEG(Mw300)15 wt % + boric acid |
| E13 | PEDOT | N | PEG(Mw300)15 wt % + PA |
| E14 | PEDOT | O | PEG(Mw300)15 wt % + PA + PG |
| E15 | PEDOT | P | PPG(Mw100)15 wt % |
| E16 | PEDOT | Q | PPG(Mw200)15 wt % |
| E17 | PEDOT | R | PPG(Mw5000)15 wt % |
| E18 | PEDOT | S | PPG(Mw6000)15 wt % |
| C1 | PEDOT | A | without polyalkylene glycol |
| C2 | PEDOT | — | without electrolyte solution |

TABLE 5-continued

| sample | solid electrolyte layer | electrolyte solution | remarks |
|---|---|---|---|
| C3 | — | A | without solid electrolyte layer, without polyalkylene glycol |
| C4 | — | B | without solid electrolyte layer, PEG(Mw300)5 wt % |
| C5 | — | C | without solid electrolyte layer, PEG(Mw300)10 wt % |
| C6 | — | D | without solid electrolyte layer, PEG(Mw300)15 wt % |
| C7 | — | E | without solid electrolyte layer, PEG(Mw300)50 wt % |

PEG: polyethylene glycol
Mw: molecular weight
PPG: polypropylene glycol
PA: pyromellitic acid
PG: pyrogallol
PEDOT: poly(3,4-ethylenedioxythiophene)

TABLE 6

| sample | initial property | | |
|---|---|---|---|
| | capacitance (μF) | ESR(Ω) | leakage current (μA) |
| E1 | 27.0 | 0.023 | 0.5 |
| E2 | 26.9 | 0.022 | 0.6 |
| E3 | 26.9 | 0.023 | 0.5 |
| E4 | 26.9 | 0.021 | 0.6 |
| E5 | 27.0 | 0.022 | 0.7 |
| E6 | 27.1 | 0.022 | 0.6 |
| E7 | 27.0 | 0.023 | 0.6 |
| E8 | 27.0 | 0.022 | 0.5 |
| E9 | 26.9 | 0.023 | 0.7 |
| E10 | 24.2 | 0.021 | 0.6 |
| E11 | 23.9 | 0.023 | 0.7 |
| E12 | 27.0 | 0.021 | 0.5 |
| E13 | 26.8 | 0.023 | 0.7 |
| E14 | 26.9 | 0.022 | 0.5 |
| E15 | 27.0 | 0.021 | 0.6 |
| E16 | 27.1 | 0.022 | 0.6 |
| E17 | 26.9 | 0.023 | 0.5 |
| E18 | 24.3 | 0.022 | 0.5 |
| C1 | 26.9 | 0.023 | 0.6 |
| C2 | 20.1 | 0.023 | 10.1 |
| C3 | 27.0 | 2.130 | 0.7 |
| C4 | 27.0 | 2.450 | 0.8 |
| C5 | 26.9 | 2.882 | 0.6 |
| C6 | 26.8 | 3.160 | 0.6 |
| C7 | 27.0 | 4.301 | 0.5 |

As shown in Table 5, hybrid-type electrolytic capacitors shown in samples E1 to E18 include electrolyte solution 16 containing polyalkylene glycol or derivatives thereof and a solid electrolyte made of an electroconductive polymer, as the electrolyte. Therefore, as shown in Table 6, samples E1 to E18 have an ESR that is as low as that of sample C2 using a solid electrolyte. Furthermore, they exhibit greater capacitance and an extremely low leakage current property as compared with sample C2.

Sample C1 is a hybrid-type electrolytic capacitor including electrolyte solution A that has been used in a conventional liquid-type electrolytic capacitor having a rated voltage of at most 100 W.V. applicable to a smoothing circuit and a control circuit at the power supply output side. Samples E1 to E18 show the same level of the initial properties as compared with sample C1.

Note here that electrolyte solutions B to E used in samples E1 to E4 contain polyethylene glycol as a solvent. Electrolyte solutions B to E are also used in samples C3 to C7. As is apparent from the results of samples C3 to C7, when electrolyte solutions B to E are used in a conventional liquid-type electrolytic capacitor, an ESR is extremely large. Thus, electrolyte solutions B to E cannot be used in liquid-type electrolytic capacitors having a low ESR and a low withstand voltage of a rated voltage of at most 100 W.V. applicable to circuits at the power supply output side, for example, a smoothing circuit or a control circuit.

Next, an acceleration test is carried out for evaluating electrolytic capacitors of samples E1 to E18 and samples C1 to C7 in the conditions beyond the guaranteed lifetime. Then, 30 samples of electrolytic capacitors of each of samples E1 to E18 and samples C1 to C7 are produced for carrying out an acceleration test.

The acceleration test is carried out in a state in which capacitor element 12 is opened without using outer package 15 in order to accelerate vaporization and volatilization of the solvent of electrolyte solution 16. That is to say, in the samples for the acceleration test, similar to the production procedure of each of the above-mentioned samples, solid electrolyte layer 122 made of PEDOT is formed in capacitor element 12 if necessary and furthermore impregnated with a predetermined amount of each of the electrolyte solutions shown in Tables 1 to 4. After that, capacitor element 12 is not accommodated in case 13 but maintained to be opened (exposed in atmosphere).

When capacitor element 12 is immersed in an anodization solution to carry out repairing anodization, or when capacitor element 12 is impregnated with a dispersion solution of an electroconductive polymer, in order to enhance the workability for the purpose of preventing the anodization solution or dispersion solution from attaching to lead wires, seal member 14 may be mounted on capacitor element 12.

Then, in the samples in this state, while a rated voltage is applied between lead wires 11A and 11B, the samples are left in a constant temperature chamber at a temperature of 125° C. for three hours. That is to say, in the acceleration test, while a rated voltage is applied between anode foil 12A and cathode foil 12B, the samples are left under 125° C. for three hours. As evaluation results of the acceleration test, measured initial properties and properties after the acceleration test are shown in Table 7. As the properties after the acceleration test, a change rate of capacitance, a change rate of ESR, a leakage current value, and an occurrence rate of short circuit are calculated. Furthermore, change of the weight of electrolyte solution 16 before and after the acceleration test is shown in Table 8.

TABLE 7

| | properties after acceleration test | | | |
|---|---|---|---|---|
| sample | change in capacitance (%) | change in ESR (%) | leakage current (μA) | occurrence rate of short circuit (%) |
| E1 | −39 | 35 | 6.1 | 0 |
| E2 | −34 | 32 | 3.5 | 0 |
| E3 | −32 | 32 | 0.6 | 0 |
| E4 | −21 | 31 | 0.5 | 0 |
| E5 | −16 | 29 | 0.7 | 0 |
| E6 | −38 | 34 | 2.5 | 0 |
| E7 | −30 | 29 | 0.5 | 0 |
| E8 | −28 | 28 | 0.6 | 0 |
| E9 | −27 | 28 | 0.5 | 0 |
| E10 | −24 | 26 | 0.6 | 0 |
| E11 | −20 | 25 | 0.4 | 0 |
| E12 | −30 | 21 | 0.1 | 0 |
| E13 | −30 | 20 | 0.1 | 0 |
| E14 | −31 | 15 | 0.1 | 0 |
| E15 | −35 | 32 | 0.6 | 0 |

TABLE 7-continued

| | properties after acceleration test | | | |
|---|---|---|---|---|
| sample | change in capacitance (%) | change in ESR (%) | leakage current (μA) | occurrence rate of short circuit (%) |
| E16 | −33 | 30 | 0.6 | 0 |
| E17 | −20 | 26 | 0.5 | 0 |
| E18 | −16 | 25 | 0.5 | 0 |
| C1 | unmeasurable | unmeasurable | unmeasurable | 100 |
| C2 | unmeasurable | unmeasurable | unmeasurable | 100 |
| C3 | −100 | unmeasurable | 0.8 | 0 |
| C4 | −40 | unmeasurable | 0.7 | 0 |
| C5 | −35 | unmeasurable | 0.8 | 0 |
| C6 | −29 | unmeasurable | 0.7 | 0 |
| C7 | −22 | unmeasurable | 0.8 | 0 |

TABLE 8

| | initial state amount within initial electrolyte solution | | properties after acceleration test remaining amount with respect to initial electrolyte solution | |
|---|---|---|---|---|
| sample | volatile solvent (wt %) | low-volatile solvent (wt %) | low-volatile solvent (wt %) | remaining rate of low-volatile solvent (%) |
| E1 | 70.0 | 5.0 | 4.9 | 98.0 |
| E2 | 65.0 | 10.0 | 9.8 | 98.0 |
| E3 | 60.0 | 15.0 | 14.8 | 98.7 |
| E4 | 25.0 | 50.0 | 49.7 | 99.4 |
| E5 | 0 | 75.0 | 74.6 | 99.5 |
| E6 | 60.0 | 15.0 | 12.9 | 86.0 |
| E7 | 60.0 | 15.0 | 14.9 | 99.3 |
| E8 | 60.0 | 15.0 | 14.9 | 99.3 |
| E9 | 60.0 | 15.0 | 15.0 | 100 |
| E10 | 60.0 | 15.0 | 15.0 | 100 |
| E11 | 60.0 | 15.0 | 15.0 | 100 |
| E12 | 60.0 | 15.0 | 14.8 | 98.7 |
| E13 | 60.0 | 15.0 | 14.9 | 99.3 |
| E14 | 60.0 | 15.0 | 14.9 | 99.3 |
| E15 | 60.0 | 15.0 | 14.6 | 97.3 |
| E16 | 60.0 | 15.0 | 14.9 | 99.3 |
| E17 | 60.0 | 15.0 | 15.0 | 100 |
| E18 | 60.0 | 15.0 | 15.0 | 100 |
| C1 | 75.0 | 0 | 0 | — |
| C2 | — | — | — | — |
| C3 | 75.0 | 0 | 0 | — |
| C4 | 70.0 | 5.0 | 4.9 | 98.0 |
| C5 | 65.0 | 10.0 | 9.8 | 98.0 |
| C6 | 60.0 | 15.0 | 14.9 | 99.3 |
| C7 | 25.0 | 50.0 | 49.7 | 99.4 |

Note here that being in an opened state at 125° C. for three hours corresponds to being in a closed (sealed) state at 105° C. for 10000 hours. This is a value that is much more than a guaranteed lifetime of an electrolytic capacitor of 5000 hours at 105° C. This correlation can be understood from the correlation between data of temperatures and speeds at which each electrolyte solution vaporizes and volatilizes when capacitor element 12 is in an opened state and data of temperatures and speeds at which each electrolyte solution permeates and disperses from seal member 14 when capacitor element 12 is tightly closed in case 13 made of aluminum and seal member 14 of rubber packing.

As is apparent from Table 7, in hybrid-type electrolytic capacitors of samples E1 to E18, as compared with sample C1, in particular, the leakage current value and the occurrence rate of short circuit are remarkably reduced after acceleration test. As shown in Table 8, the solvent of electrolyte solution A used in sample C1 is only volatile γ-butyrolactone and sulfolane, so that vaporization and volatilization proceed under a high-temperature environment. As a result, after the acceleration test, the weight cannot be measured, and a solvent is lost. Consequently, a function of repairing a defective part in the dielectric oxide film by the electrolyte solution cannot be maintained, the leakage current value is increased and the occurrence rate of short circuit is higher.

On the other hand, since electrolyte solutions B to S used in samples E1 to E18 contain polyalkylene glycol as a solvent, as shown in Table 8, vaporization and volatilization of the electrolyte solution are suppressed even under a high temperature. Although not shown in Table 8, in any samples, a remaining amount of a volatile solvent after the acceleration test cannot be measured.

Thus, even after the acceleration test, in other words, even beyond the guaranteed lifetime, samples E1 to E18 maintain the function of repairing a defective part in the dielectric oxide film by the electrolyte solution. Consequently, the leakage current value and the occurrence rate of short circuit are suppressed. Therefore, samples E1 to E18 have extremely high reliability.

Furthermore, as shown in the evaluation results of samples E3 to E5, when the content amount of polyethylene glycol contained in the electrolyte solution is made to be at least 15 wt. %, an increase in leakage current and the occurrence rate of short circuit can be more reduced as compared with those of samples E1 and E2. In this way, when the content amount of polyethylene glycol is made to be at least 15 wt. %, even if the electrolytic capacitor is exposed to a high-temperature environment beyond the guaranteed lifetime, it is thought that the performance and amount of an electrolyte solution sufficient to repair defective parts occurring on the entire surface of dielectric layer 121 can be maintained. Therefore, an excellent short-circuit resistance property can be ensured.

Furthermore, in samples E3, and E6 to E11, the molecular weight of polyethylene glycol contained in the electrolyte solution is changed. From the results of samples E3, E7, E8, and E9, it is shown that when the molecular weight of polyethylene glycol is in a range from 300 to 1000, inclusive, the increase in leakage current and the occurrence rate of short circuit can be particularly reduced. When the molecular weight of polyethylene glycol is in a range from 300 to 1000, inclusive, a function of the solvent can be exhibited in a liquid state, low volatility is exhibited and the weight is hardly reduced even under a high-temperature environment as in an acceleration test. Therefore, an effect of repairing a defective part in a dielectric oxide film by a nonvolatile solute dissolved in the solvent can be maintained.

On the other hand, as shown in sample E6, even if the molecular weight of polyethylene glycol is 200, a function of a liquid-state solvent can be exhibited. However, under a high-temperature environment, polyethylene glycol is vaporized and volatilized gradually although very slightly as compared with volatile solvents such as γ-butyrolactone and sulfolane. In other words, among samples E1 to E18, a sample having the smallest remaining rate of the low-volatile solvent is sample E6. Even in this case, the leakage current and the occurrence rate of short circuit are remarkably reduced as compared with those of sample C1. Therefore, electrolyte solution 16 may have a composition so that at least 86% of the low-volatile solvent remains after the electrolytic capacitor is left under 125° C. for three hours while outer package 15 is opened and a rated voltage of the electrolytic capacitor is applied between lead wires 11A and 11B.

Note here that this example describes a case in which polyethylene glycol having a molecular weight of 200 is used as the low-volatile solvent. However, any other low-volatile solvents may be used as long as at least 86% of the low-volatile solvent remains after the acceleration test. Furthermore, since the volatility of the solvent is affected by interaction with respect to other components contained in the electrolyte solution, the remaining rate may be achieved by a factor of components of the electrolyte solution other than the physical property of the low-volatile solvent itself.

On the other hand, as shown in samples E10 and E11, when the molecular weight of polyethylene glycol is increased to 1500 and 2000, the solvent shows low volatility and the weight thereof is hardly reduced even under a high-temperature environment. However, viscosity is extremely increased and the impregnation property with respect to capacitor element 12 is lowered, and thus the effective capacitance rate is low.

That is to say, even in the case where the molecular weight of polyethylene glycol is 200 or less and in the case where the molecular weight of polyethylene glycol is 1500 or more, as compared with a conventional hybrid-type electrolytic capacitor, when the electrolytic capacitor is exposed to a high-temperature environment beyond the guaranteed lifetime, it is possible to remarkably improve electric properties and to reduce occurrence rate of short circuit. However, in order to achieve a stably effective capacitance and an effect of suppressing the increase in leakage current and occurrence of short circuit, it is preferable that the molecular weight of polyethylene glycol is in a range from 300 to 1000, inclusive.

Furthermore, as shown in samples E15 to E18, when polypropylene glycol is used as a low-volatile solvent contained in the electrolyte solution, the same effect can be achieved as in the case where polyethylene glycol is used. That is to say, after the acceleration test, in other words, even beyond the guaranteed lifetime, a function of repairing a defective part in dielectric layer 121 can be maintained. As a result, the leakage current value and the occurrence of short circuit can be suppressed. Thus, an electrolytic capacitor with extremely high reliability can be achieved.

Note here that as shown in sample E15, even if the molecular weight of polypropylene glycol is 100 or less, a function of a liquid state solvent can be exhibited. However, under a high-temperature environment, polypropylene glycol is vaporized and volatilized gradually although very slightly as compared with volatile solvents such as γ-butyrolactone and sulfolane.

Furthermore, as shown in sample E18, when the molecular weight of polypropylene glycol is 6000 or more, the solvent shows low volatility and the weight thereof is hardly reduced even under a high-temperature environment. However, viscosity is extremely increased and the impregnation property with respect to capacitor element 12 is lowered, and thus the effective capacitance rate is low.

Therefore, similar to the case of polyethylene glycol, in order to achieve a stably effective capacitance and an effect of suppressing the increase in leakage current and occurrence of short circuit, it is preferable that the molecular weight of polypropylene glycol is in a range from 200 to 5000, inclusive.

Furthermore, electrolyte solution M used in sample E12 contains boric acid in a component element, and electrolyte solution N used in sample E13 contains pyromellitic acid in a component element. In addition, electrolyte solutions M and N are formed so that the ratio of the acid and the base contained in the solute and additives dissolved in the solvent shows that the acid is more than the base, and they are in contact with the circumference of PEDOT of solid electrolyte layer 122. That is to say, components dissolved in the low-volatile solvent include a base and an acid more than the base. Therefore, electrolyte solutions M and N can suppress dedoping of polystyrene sulfonic acid as the dopant contained in PEDOT. Furthermore, since the solvent is low-volatile, even after the acceleration test, that is, even beyond the guaranteed lifetime, the effect against dedoping can be maintained. As a result, in samples E12 and E13, the change of ESR is suppressed. In other words, samples E12 and E13 exhibit extremely high reliability.

Furthermore, in sample E14, electrolyte solution O contains pyrogallol as an oxidation inhibitor, and it is in contact with the circumference of PEDOT of solid electrolyte layer 122. Therefore, electrolyte solution O can suppress deterioration of PEDOT due to oxidation. Furthermore, since the solvent is low-volatile, after the acceleration test, that is, even beyond the guaranteed lifetime, the effect of suppressing deterioration due to oxidation can be maintained. As a result, in sample E14, the change of ESR is suppressed. That is to say, sample E14 exhibits extremely high reliability.

An electrolytic capacitor of the present disclosure includes an electrolyte solution, and a solid electrolyte such as an electroconductive polymer. Therefore, the electrolytic capacitor of the present disclosure has a small size, a large capacitance, and a low ESR. Furthermore, the electrolyte solution has an effect of repairing a defective part occurring in a dielectric layer provided on the surface of the anode foil. The electrolyte solution of the electrolytic capacitor of the present disclosure contains polyalkylene glycol or derivatives thereof having extremely low volatility. Therefore, even if the electrolytic capacitor is used under a high-temperature environment of a maximum working temperature of 85° C. to 150° C. for a long time beyond the guaranteed lifetime, a defective part occurring in the dielectric layer can still be repaired.

Therefore, the electrolytic capacitor of the present disclosure has a small size, a large capacitance, and a low ESR, as well as can suppress the increase in leakage current, and ensure an excellent short-circuit resistance property. Therefore, the electrolytic capacitor of the present disclosure is useful as electrolytic capacitors used in a smoothing circuit or a control circuit at the power supply output side of electrical apparatus which require high reliability for a long time, for example, AV apparatus or electrical apparatus mounted on vehicles.

What is claimed is:

1. An electrolytic capacitor comprising:
   a capacitor element having:
      an anode foil having a dielectric layer thereon; and
      a solid electrolyte layer including a conductive polymer and in contact with the dielectric layer, and
   an electrolyte solution with which the capacitor element is impregnated,
   wherein the electrolyte solution contains:
      a solvent including at least one of polyalkylene glycol and derivatives thereof, and
      a component including at least one of diphenyl amine, naphthol, nitrophenol, catechol, resorcinol, hydroquinone, pyrogallol, trimellitic acid, pyromellitic acid, boric acid, boric-acid compounds, phosphoric acid, phosphoric-acid compounds, and complexes of mannitol and boric acid.

2. The electrolytic capacitor according to claim 1,
   wherein the component contains at least one of catechol, resorcinol, hydroquinone, pyrogallol, pyromellitic acid, and boric acid.

3. An electrolytic capacitor comprising:
   an anode foil having a dielectric layer thereon;
   a solid electrolyte layer including a conductive polymer and in contact with the dielectric layer;
   a solvent in contact with the dielectric layer and including at least one of polyalkylene glycol and derivatives thereof; and
   a component dissolved in the solvent and including at least one of diphenyl amine, naphthol, nitrophenol, catechol, resorcinol, hydroquinone, pyrogallol, trimellitic acid, pyromellitic acid, boric acid, boric-acid compounds, phosphoric acid, phosphoric-acid compounds, and complexes of mannitol and boric acid.

4. The electrolytic capacitor according to claim 3,
   wherein the component includes at least one of catechol, resorcinol, hydroquinone, pyrogallol, pyromellitic acid, and boric acid.

5. A manufacturing method for an electrolytic capacitor, the method comprising:
   forming a capacitor element including an anode foil having a dielectric layer thereon, and a solid electrolyte layer including a conductive polymer and in contact with the dielectric layer; and
   impregnating the capacitor element with an electrolyte solution,
   wherein the solid electrolyte layer is formed by impregnating the capacitor element with a dispersion solution containing at least one of polythiophene and derivatives thereof dispersed in a dispersion medium, and removing the dispersion medium from the dispersion solution thereafter, and
   the electrolyte solution contains:
      a solvent including at least one of polyalkylene glycol and derivatives thereof, and
      a dissolved component including at least one of diphenyl amine, naphthol, nitrophenol, catechol, resorcinol, hydroquinone, pyrogallol trimellitic acid, pyromellitic acid, boric acid, boric-acid compounds, phosphoric acid, phosphoric-acid compounds, and complexes of mannitol and boric acid.

6. The method according to claim 5,
   wherein the dissolved component includes at least one of catechol, resorcinol, hydroquinone, pyrogallol, pyromellitic acid, and boric acid.

7. The electrolytic capacitor according to claim 1,
   wherein a total weight content of polyalkylene glycol and derivatives thereof in the solvent is 15 wt % or greater with respect to a weight of the electrolyte solution.

8. The electrolytic capacitor according to claim 3,
   wherein a total weight content of polyalkylene glycol and derivatives thereof in the solvent is 15 wt % or greater with respect to a total weight of the solvent and the component.

9. The method according to claim 5,
   wherein a total weight content of polyalkylene glycol and derivatives thereof in the solvent is 15 wt % or greater with respect to a weight of the electrolyte solution.

* * * * *